US010133796B2

(12) United States Patent
Mallasch et al.

(10) Patent No.: US 10,133,796 B2
(45) Date of Patent: *Nov. 20, 2018

(54) DATA MANAGEMENT SYSTEM

(71) Applicant: APiJET, LLC, Seattle, WA (US)

(72) Inventors: Paul G. Mallasch, North Bend, WA (US); Asha Wadhwa, Seattle, WA (US); Benson Miller, Seattle, WA (US); Jonathan Roberts, Sammamish, WA (US); Yuri Brigance, Port Orchard, WA (US)

(73) Assignee: APIJET, LLC, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/480,357

(22) Filed: Apr. 5, 2017

(65) Prior Publication Data

US 2017/0212900 A1 Jul. 27, 2017

Related U.S. Application Data

(63) Continuation of application No. 14/518,691, filed on Oct. 20, 2014, now Pat. No. 9,652,517.

(51) Int. Cl.
*G06F 17/30* (2006.01)

(52) U.S. Cl.
CPC .... *G06F 17/3056* (2013.01); *G06F 17/30371* (2013.01); *G06F 17/30569* (2013.01)

(58) Field of Classification Search
CPC .... G06F 8/30; G06F 11/1425; G06F 11/1446; G06F 11/2038; G06F 17/30241; G06F 17/30587; G06F 17/30817; G06F 17/3087; G06F 3/0484; G06F 3/0647; G06F 3/0688; G06F 17/10; G06F 17/30569

See application file for complete search history.

(56) References Cited

U.S. PATENT DOCUMENTS 7,203,630 B2   4/2007 Kolb
7,584,032 B2   9/2009 Bauman
(Continued)

OTHER PUBLICATIONS

Notice of Allowance from related U.S. Appl. No. 14/518,691 dated Mar. 6, 2017, 29 pages.

*Primary Examiner* — Debbie Le
(74) *Attorney, Agent, or Firm* — Lane Powell PC

(57) ABSTRACT

In connection with processing asynchronous streams of aircraft telemetry data, data processing logic is developed to run on multiple aircraft, even if different avionics equipment are installed on the aircraft. An electronic inventory system tracks data available on affected aircraft. A set of "global" data elements applicable to aircraft in a fleet is defined and is tracked in the electronic inventory system, with relationship to the underlying native data elements and specific aircraft. The global units are derived as appropriate, for each specific aircraft avionics environment. An interface enables definition of data processing logic that is integrated with the electronic inventory system and ensures the general validity of the defined logic. The data processing logic is deployed to one or more aircraft in a function integrated with the electronic inventory system, to ensure the validity of the data processing logic for each aircraft specified as a deployment target.

20 Claims, 12 Drawing Sheets

(56) References Cited

U.S. PATENT DOCUMENTS

| | | | |
|---|---|---|---|
| 8,132,155 B2* | 3/2012 | Gvillo | G06F 8/30 701/29.1 |
| 2008/0215204 A1 | 9/2008 | Roy | |
| 2014/0075506 A1 | 3/2014 | Davis | |
| 2015/0324501 A1* | 11/2015 | Desell | G01C 23/00 703/2 |

* cited by examiner

DATA MANAGEMENT SYSTEM

CROSS-REFERENCE TO RELATED APPLICATIONS

This application is a continuation of U.S. patent application Ser. No. 14/518,691 filed on Oct. 20, 2014, now allowed, the contents of all of which are incorporated herein by reference in its entirety.

BACKGROUND

Aircraft generate a substantial amount of telemetry data during their normal operation. With appropriate physical connections and data-reading modules, the telemetry data can be accessed by other systems on the aircraft. Most traditional avionics systems provide a small number of related functions and each avionics system connects directly to the data sources that are required for its proper operation. As distinct from modern data networks, where all systems connected to a network are—at least in principle—able to share information with all other systems on a network, airplane systems are each only connected to a small number of other systems according to their unique data needs. Historically, the time and costs involved in acquiring additional data from systems installed on an aircraft is substantial, due to the level of regulatory oversight and physical-installation engineering. This common architecture severely restricts the ability of a system or application to acquire a different set of data as the systems installed on an aircraft evolve.

In contrast to traditional avionics, it is becoming increasingly more common to install systems onboard the aircraft that provide a generalized data-processing function. These data processing systems connect to a wide variety of data sources, including data sources that may not be necessary for whatever data processing logic is currently executing on the aircraft. As the airline's data processing needs evolve, the airline may add or change the data processing logic, in many cases without making additional physical connections to onboard systems. The results of such processing of aircraft data can be used onboard or offboard for various purposes, including, without restriction, streamlining maintenance activities, decreasing fuel consumption, or driving new efficiencies within fleet operations. Such benefits are broad and described, for example, in U.S. Pat. No. 7,203,630.

Within an operator's fleet of aircraft, it is common for different aircraft to be equipped with different avionics systems. Variations in equipment make and model create variations in the data that is available for acquisition and processing on each aircraft. Such variations can include—without restriction—changes to data identifiers, refresh intervals, units, and precision. As a result, it is common for data processing logic to be written that is only applicable to small groups of identically equipped aircraft. For airlines with strongly heterogeneous fleets of many different types of aircraft, it is cumbersome to apply similar data processing logic across their entire fleet because the logic must be re-implemented for the specific data characteristics of each distinct aircraft or sub-fleet that includes a specific make and model of avionics system. As a result, data processing logic is changed infrequently and at substantial cost to the airlines.

Furthermore, for most airlines, the creation of new data processing instructions typically requires the technical assistance of the data-processing system vendor, and, once the new instructions are created, adding the instructions to the onboard data processing system requires ground personnel to manually transfer the new software instructions to the aircraft using a specialized data loading system (typically called a "data loader"). Systems are also available that use wireless data exchange to eliminate the manual transfer of updated instructions to the aircraft. The wireless data loading systems can update one or more target systems with new data processing instructions without ground personnel physically accessing the aircraft. In both of these cases, data processing instructions are updated only when the aircraft is on the ground and parked. This process is inefficient because it requires assistance from the system vendor and because it requires that the aircraft be parked on the ground before the system is updated.

Thus, although there are many generalized computing devices that can acquire data from various aircraft sources (including commercial and military standards), new technology is needed that: (a) provides a layer of data abstraction such that an operator can define data processing logic, which runs identically across aircraft with different makes and models of avionics equipment; (b) enables airline operators to competently develop data processing logic without vendor oversight; and, (c) allows airline operators to update the data processing rules on aircraft without waiting for the aircraft to be parked.

SUMMARY

Accordingly, the following discloses an exemplary method for enabling the creation and maintenance of an inventory of data elements that are available on a plurality of aircraft in a fleet, where the plurality of aircraft can have different installed avionics equipment that are associated with the data elements. This method includes decoding aircraft telemetry data from the avionics equipment, wherein the telemetry data can have any of a plurality of different standard protocols, producing output data having a specific desired protocol and format. The output data are processed to produce new or derivative data elements, which are available for use on one or more of the plurality of aircraft in the fleet. Aircraft included in the plurality of aircraft are queried for existing data element, new data elements, and derivative data elements that are available for use on the aircraft. An inventory of these data elements that are available for use on the plurality of aircraft in the fleet is then created.

The method further includes authoring new data processing logic for processing the output data on one or more of the plurality of aircraft in the fleet. The new data processing logic is included with the inventory of the existing data elements, the new data elements, and the derivative data elements. The method further includes validating whether the new data processing logic can be used for processing the output data on one or more of the plurality of aircraft in the fleet, including aircraft with different avionics equipment. If so, the new data processing logic is deployed to each of the one or more aircraft in the fleet for which the new data processing logic has been validated, for use in processing the output data.

Each new data processing logic comprises a logic configuration that can execute on an aircraft to which it has been deployed. The output data decoded from aircraft telemetry data on at least some of the plurality of aircraft in the fleet is used to derive global data units that are common to different types of related avionics equipment. Accordingly, the new data processing logic that is deployed to at least some of the aircraft will be validated as being able to use that new data processing logic to process the global data units, independent of the avionics equipment that produced the data elements from which the global data units were derived.

Decoding aircraft telemetry data produced by one type of avionics equipment can include applying an appropriate first decoding logic, and decoding corresponding telemetry data produced by a different but related type of avionics equipment includes applying an appropriate second decoding logic. The first and second decoding logic produce decoded data elements from which a common global unit is derived, enabling the common global data unit to be processed by the new processing logic deployed to aircraft on which either type of avionics equipment is installed.

Creating the inventory comprises creating a physical layer database that tracks physical characteristics of each data element that is available on each of the plurality of aircraft in the fleet. The physical characteristics for each data element include one or more of a source avionics device or system that generates the data element; a physical communications channel on which the data element is conveyed; a protocol used on the physical channel on which the data element is conveyed; a type and precision of the data element; and metadata used to uniquely identify the data element from among all other data elements conveyed on the physical channel.

The exemplary method further includes using entries in the physical layer database for each aircraft of the plurality of aircraft in the fleet to generate a set of data decoding rules comprising a decode layer database. The data decoding rules specify how each data element in the physical layer database of the aircraft should be translated into messages having a desired common format and protocol, and which are used to generate the decoded data.

Using the decode layer database, a desired set of global data derivation rules are generated and are used to create a set of global data elements for each aircraft. A global layer database is employed to track associations between the global data elements, the global data derivation rules that create each global data element, and any decode layer elements on which the global data derivation rules depend.

The global data elements are each output in the specified desired format and protocol used to generate associated decoded data elements, so that subsequent data processing logic can access both global data elements and associated decoded data elements.

The new data processing logic comprises a logic configuration that can be deployed to each aircraft in the fleet for which any global data elements used by the new data processing logic of the logic configuration have been generated.

The physical layer database, the decode layer database, and the global layer database comprise a data catalog for the plurality of aircraft in the fleet, and the data catalog of all data elements that are available on each of the plurality of aircraft in the fleet is used in determining whether a logic configuration can validly be deployed to a specific aircraft in the fleet. If a logic configuration can validly be deployed to an aircraft, the logic configuration is conveyed to a data processing node on the aircraft. The data processing node uses the logic configuration for processing the data elements associated with the logic configuration.

Another aspect of this technology is directed to an exemplary system for creating an inventory of data elements that are available on a plurality of aircraft in a fleet, where the plurality of aircraft can have different installed avionics equipment that produce telemetry data corresponding to the data elements. The system includes elements that function in a manner generally consistent with the exemplary method discussed above.

Still another aspect of the technology is directed to an exemplary method for creating and deploying common processing logic that can be used in processing telemetry data produced by different types of avionics equipment installed on a plurality of aircraft in a fleet. This method is also generally consistent with various aspects of the method discussed above.

This application specifically incorporates by reference the disclosures and drawings of each patent application and issued patent identified above as a related application.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein.

DESCRIPTION

Figure 1:
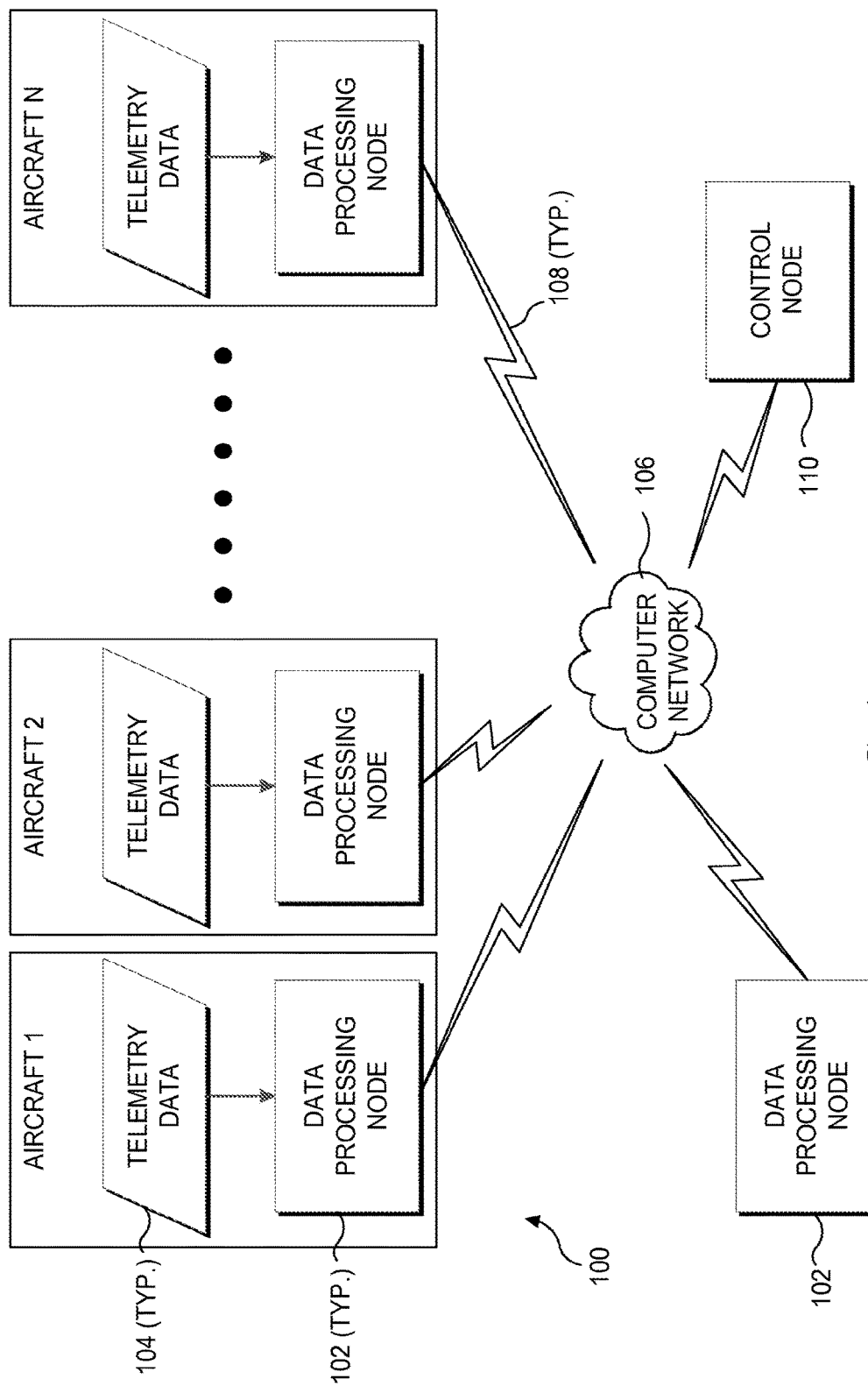
FIG. 1 is a schematic block diagram of an exemplary system for coupling DATA PROCESSING NODES on a plurality of aircraft and at a ground station in data communication with a CONTROL NODE, to facilitate the novel technology disclosed herein.

Figures and Disclosed Embodiments are not Limiting

Exemplary embodiments are illustrated in referenced Figures of the drawings. It is intended that the embodiments and Figures disclosed herein are to be considered illustrative rather than restrictive. No limitation on the scope of the technology and of the claims that follow is to be imputed to the examples shown in the drawings and discussed herein. Further, it should be understood that any feature of one embodiment disclosed herein can be combined with one or more features of any other embodiment that is disclosed, unless otherwise indicated.

It is assumed that any data processing system on an aircraft has the ability to receive data from standard aircraft data sources, whether via civilian or military protocols. The details of interconnecting avionics systems using standard civilian or military protocols (ARINC 429, ARINC 717, MIL-1553, et al.) are well known in the art and need not be discussed herein. A data processing system typically provides the basic abilities to interpret such data, reformat the data, apply transformations, and generate some types of output. Such functionality generally comprise foundational capabilities of data processing systems. In contrast to such prior art functionality, the present novel approach provides a data abstraction layer that maintains an inventory of "global" data elements, and these elements are derived by the data processing system and made available to data processing instructions across a fleet of aircraft with disparate avionics equipment. Furthermore, the present novel approach provides a technical integration of a global data inventory with the process of creating or modifying (which together correspond to "authoring") data processing logic for aircraft, and subsequently validating the data processing logic before deploying the logic to one or more aircraft.

Throughout this disclosure and the claims that follow, the term "LOGIC CONFIGURATION" is used to indicate a complete unit of data processing logic that runs on an aircraft. As an example, a LOGIC CONFIGURATION might instruct the data processing system to read a specified set of data elements from a stream of aircraft telemetry data and generate an hourly report on the minimum, maximum, and average values of each of the specified elements. As another example, a LOGIC CONFIGURATION might instruct the data processing system to generate an alert message when the value of a specified data element exceeds a predefined threshold. In yet another example, a LOGIC CONFIGURATION might instruct the data processing system to generate a message at predefined intervals of time, e.g., every 300 seconds, which contains the current values for a specified set of data elements. It is assumed that a data processing system manages one or more LOGIC CONFIGURATIONS concurrently, as required to support an airline's business processes.

For LOGIC CONFIGURATIONS to run in a similar manner across aircraft with different equipment, the LOGIC CONFIGURATION must be implemented independently of the data output characteristics of any proprietary equipment. Otherwise, if a piece of equipment is changed—and causes the data output characteristics to change—then any LOGIC CONFIGURATION that is dependent on the replaced hardware will also need to change.

To avoid this problem, the present novel approach standardizes on a specific set of well-defined elements that satisfy the desired data processing logic and which are available or can be derived on all aircraft in a fleet of aircraft. These data elements that are available on all aircraft—or, as can sometimes be the case, on many, but not necessarily all, different types of aircraft—are referred to herein and in the claims that follow as "GLOBAL UNITS." By developing data processing logic to use GLOBAL UNITS, a LOGIC CONFIGURATION can run as expected on all aircraft on which these GLOBAL UNITS are available, including, in most cases, aircraft with different equipment. Furthermore, if the equipment on an aircraft is modified, it is not necessary to modify a LOGIC CONFIGURATION (or, as is commonly the case, many LOGIC CONFIGURATIONS). Instead, it should only be necessary is to modify the logic by which the affected GLOBAL UNITS are derived on the affected aircraft.

Figure 7:
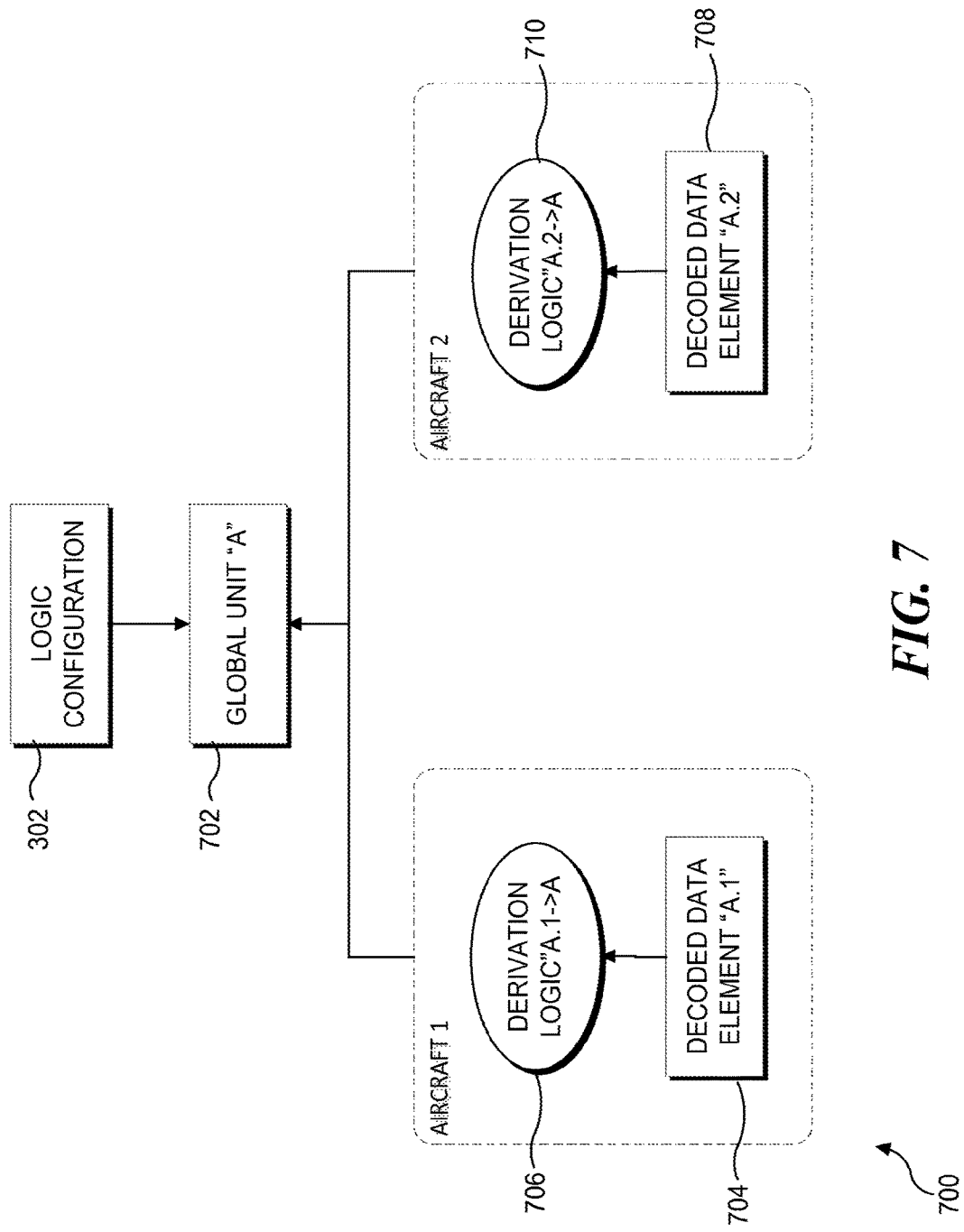
FIG. 7 is a schematic block diagram illustrating how a GLOBAL UNIT is derived from different DECODED DATA on two different aircraft using appropriate different Derivation Logic.

FIG. 7 is a schematic block diagram 700 that provides an illustration of this concept, showing a single definition of a data processing LOGIC CONFIGURATION 302 that references a single GLOBAL UNIT "A" 702 that is derived differently on two different aircraft. On a first aircraft 1, GLOBAL UNIT "A" is derived from a Decoded Data Element "A.1" 704 via a Derivation Logic "A.1>A" 706, while on a second Aircraft 2, a GLOBAL UNIT "A" is derived from a Decoded Data Element "a.2" 708 via a Derivation Logic "a.2>A" 710.

The foundation for the present exemplary approach is based on the structured tracking of the data environment on each airplane. The structure of this tracking can be described in terms of three logical layers:

1. a PHYSICAL LAYER;
2. DECODE; and
3. GLOBAL.

Figure 8:
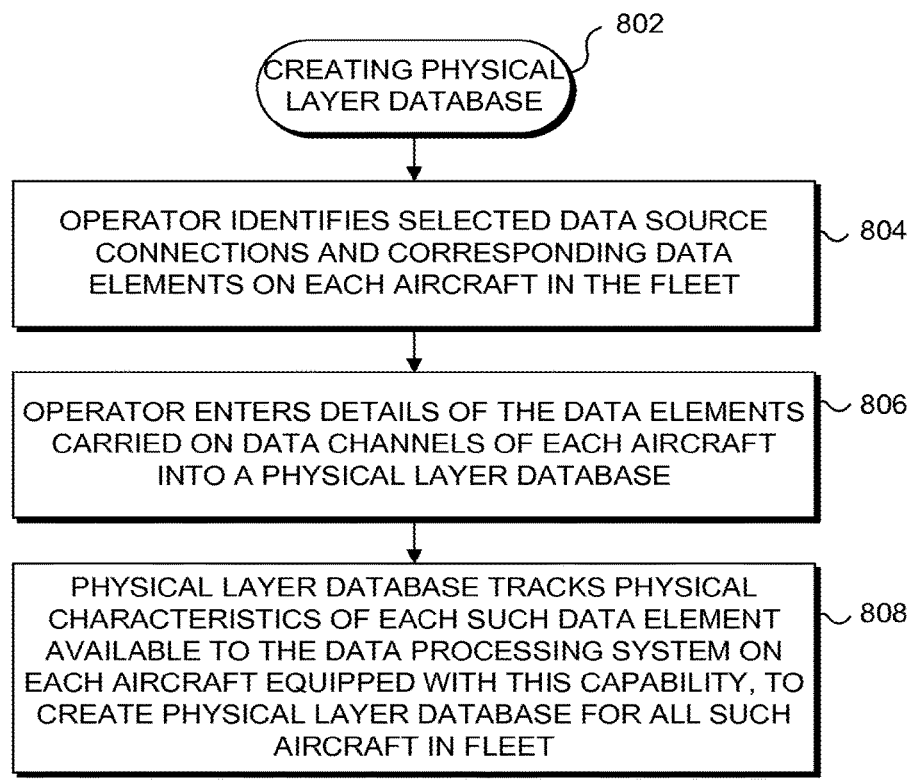
FIG. 8 is a flowchart illustrating exemplary logic for creating a PHYSICAL LAYER database, in connection with the present approach.

Physical Layer:

A flowchart 800 in FIG. 8 illustrates an exemplary logic for creating a PHYSICAL LAYER database, as indicated in a block 802. As noted in a block 804, an operator identifies selected data source connections and corresponding data elements on each aircraft in the fleet. Next, as noted in a block 806, for the data elements carried on data channels of each aircraft, the operator enters details of the data elements that are carried on data channels of each aircraft into a PHYSICAL LAYER database. Finally, as broadly provided in a block 808, the PHYSICAL LAYER database then tracks the physical characteristics of each such data element that is available to the generalized data processing system on each aircraft equipped with this capability, including, without restriction, a source system that generates the data element, a physical communications channel on which each data element is transmitted, a protocol used on the physical channel, a refresh interval for the data element, a type and a precision of the data element, and any metadata that are required to identify the specific data element from among other data elements conveyed on the same channel (e.g., position, label, tag, etc.). The owner of the fleet of aircraft may select the specific data elements that are thus tracked in the PHYSICAL LAYER.

Figure 9:
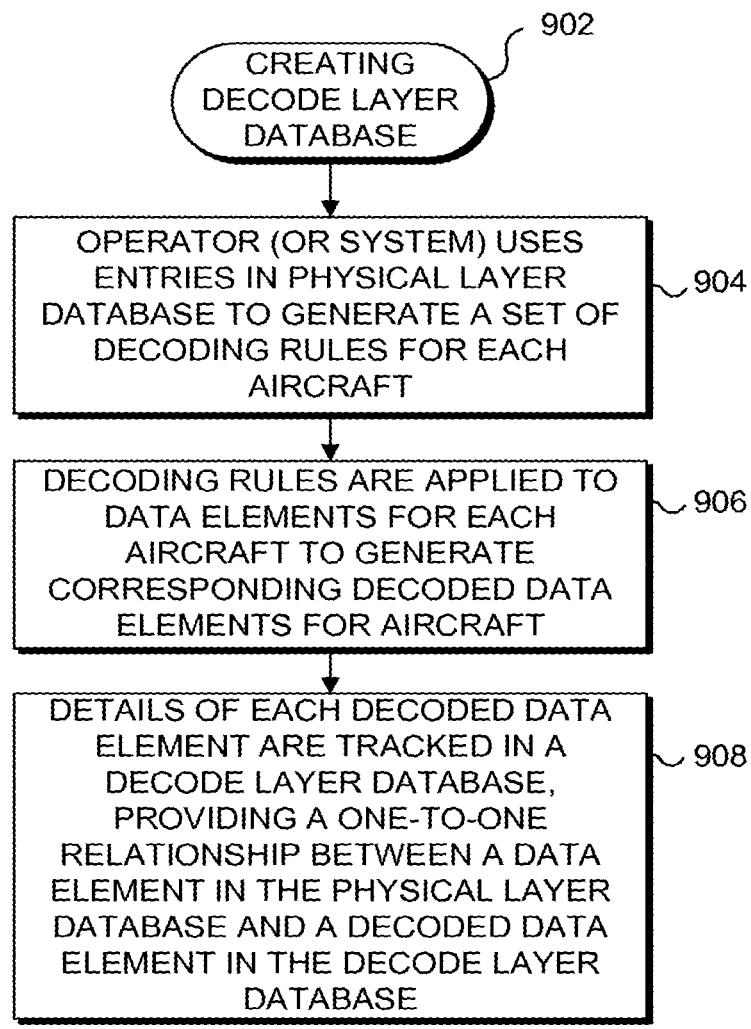
FIG. 9 is a flowchart illustrating exemplary logic for creating a DECODE LAYER database.

Decode Layer:

In FIG. 9, a flowchart 900 illustrates exemplary logic for creating a Decode Layer database, as noted in a start block 902. In a block 904, an operator uses the entries in the PHYSICAL LAYER database to generate a set of data decoding rules for each aircraft. The decoding rules specify how data at the PHYSICAL LAYER of an aircraft are translated into messages that share a common format and protocol. The use of a common format and protocol distinguishes the present novel approach from traditional approaches, in which data processing is logically developed for data received on a specific physical channel. Furthermore, the common format and protocol simplifies the interpretation and use of data by the generalized data processing system of the aircraft.

As indicated in a block 906, data that are generated by the decoding rules are referred to as "DECODED DATA." A block 908 indicates that for each data element in the DECODED DATA, the details of that element are tracked in a DECODE LAYER database. In the DECODE LAYER database, the decoded element's name, its association with a data element at the PHYSICAL LAYER, and various other metadata about the element (e.g., type, units, precision, refresh interval, and range) are tracked. There is a one-to-one relationship between a data element at the PHYSICAL LAYER and a decoded data element in the DECODE LAYER.

It should be understood that in this exemplary embodiment, the generation of data decoding rules may be accomplished manually or in an automated manner. The data decoding rules may run directly on the generalized data processing system or they may run on a separate data aggregation device; both architectures are common in the aviation industry and the exemplary method described herein supports both architectures equally well. What is important is the implementation of a set of data decoding rules that are centrally controlled, with known, tracked dependencies between the DECODED DATA in the DECODE LAYER and the data elements of the PHYSICAL LAYER for an aircraft.

Figure 10:
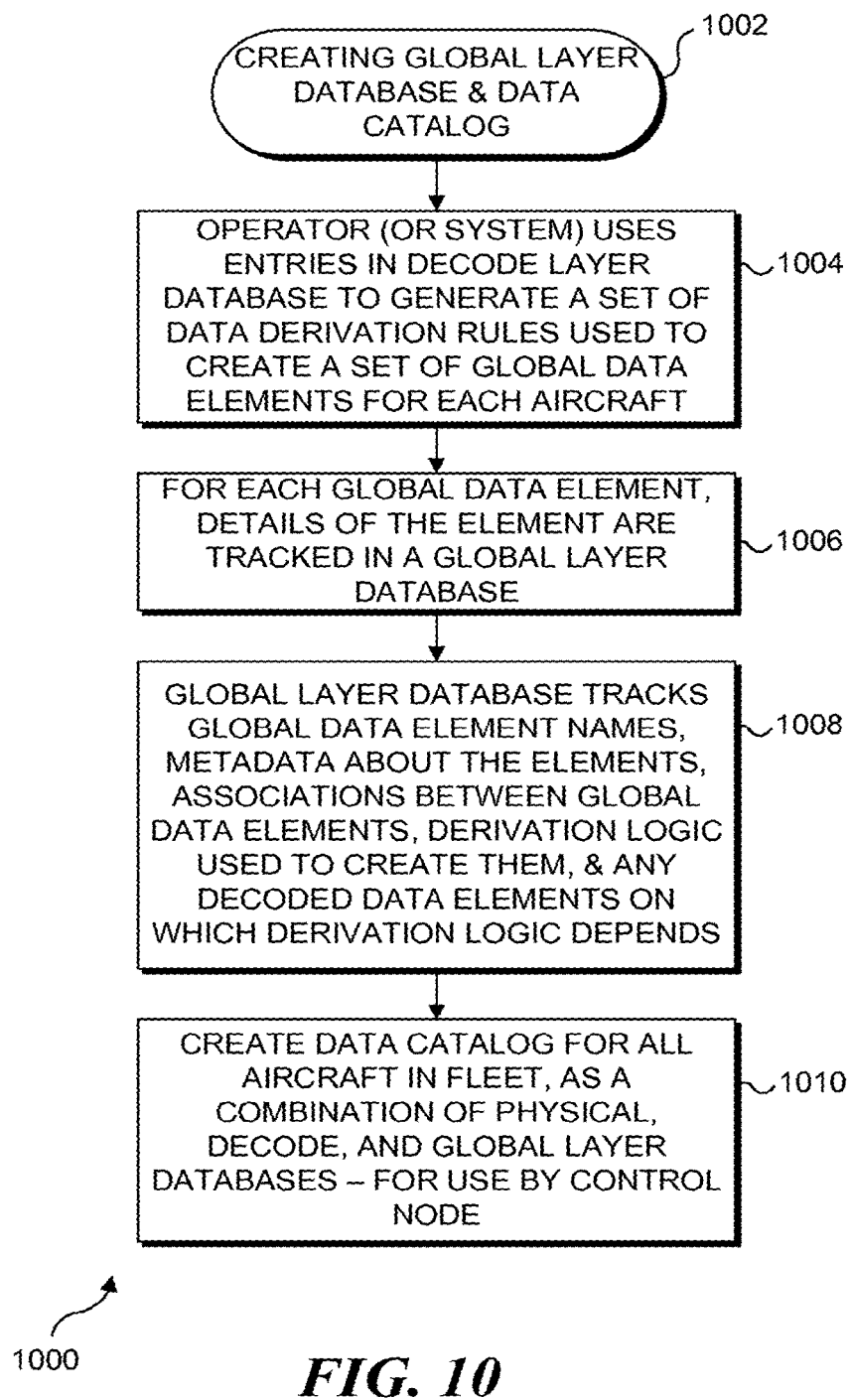
FIG. 10 is a flowchart illustrating exemplary logic for creating a GLOBAL LAYER database and a DATA CATALOG.

Global Layer:

The implementation of a PHYSICAL LAYER database, a DECODE LAYER database, and a set of decoding rules that output DECODED DATA do not, by themselves, enable an operator to create data processing rules that operate across different types of aircraft. For that, the present exemplary embodiment employs an additional GLOBAL LAYER and a set of GLOBAL DATA derivation rules. Exemplary logic for creating a GLOBAL LAYER database and a DATA CATALOG are set forth in a flowchart 1000 in FIG. 10, beginning at a start block 1002.

As provided in a block 1004, an operator (or automated system) uses the entries in the DECODE LAYER database to generate a set of GLOBAL DATA derivation rules to create the desired set of Global Data Elements (collectively referred to as "GLOBAL DATA") for each aircraft. For each Global Data Element in the GLOBAL DATA, the details of that element are tracked in the GLOBAL LAYER database, as provided in a block 1006. As noted in a block 1008, in the GLOBAL LAYER database, the GLOBAL DATA element's name and various other metadata about the element (e.g., type, units, precision, refresh interval, range) are tracked. Also tracked in the GLOBAL LAYER are the associations between GLOBAL DATA elements, the derivation rules that create them, and any DECODE LAYER elements on which the derivation rules depend. Thus, as suggested by FIG. 7, the GLOBAL LAYER is employed to track the metadata characteristics of each Global Data Element, e.g., Global Unit "A" 702, the associations between that element, and the two Derivation Logics 706 and 710, and the dependencies of the two Derivation Logics on specific elements in DECODED DATA ELEMENTS 704 and 708.

In many cases, on a single aircraft, there will be a one-to-one relationship between an element in the DECODED DATA and an element in the GLOBAL DATA. In some cases, multiple PHYSICAL LAYER data elements may be used to generate a single element in the DECODED DATA, and similarly, multiple DECODE LAYER elements might be employed in generating a single element of the GLOBAL DATA. As an example of the latter case, it is common that longitude values are split into separate data elements on an ARINC 717 data bus, with the most significant bits and the least significant bits being transmitted in different data frames. The decoding for a unified "longitude" data element at the GLOBAL LAYER might thus rely on two DECODE LAYER elements that comprise the complete determination of longitude.

GLOBAL DATA is output in the same format and protocol as generated for the DECODED DATA, such that downstream data processing logic can access GLOBAL DATA and DECODED DATA using the same mechanism. However, it is the GLOBAL DATA that is independent of the types of avionics equipment that may be installed on different aircraft in the fleet.

Figure 6:
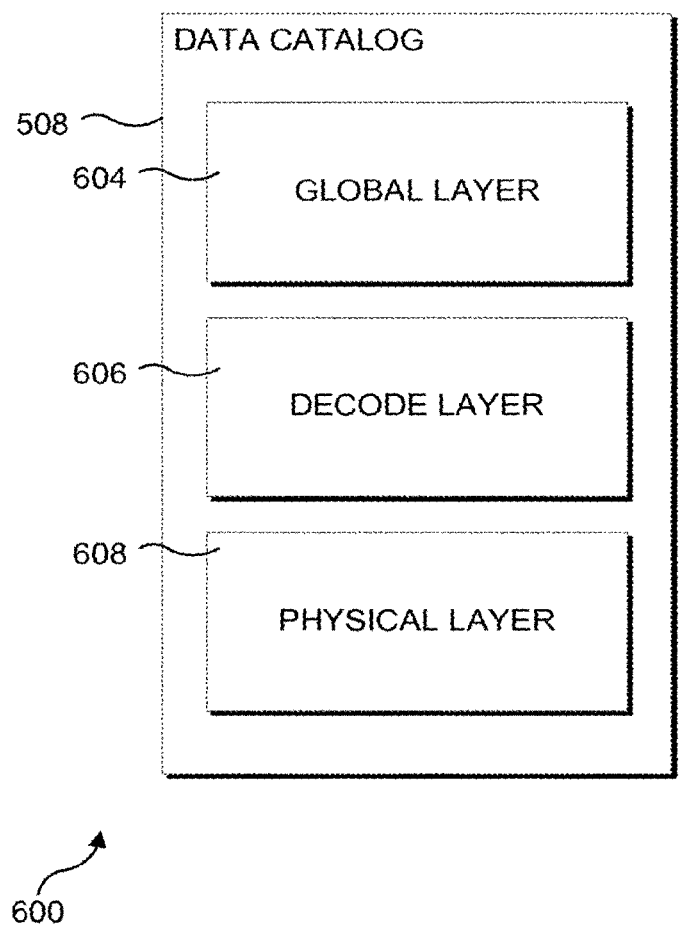
FIG. 6 is a schematic block diagram illustrating components included in an exemplary DATA CATALOG used in the present approach.

Referring to a schematic block diagram 600 shown in FIG. 6, the databases for a PHYSICAL LAYER 608, a DECODE LAYER 606, and GLOBAL LAYER 604 together comprise a single logical entity, which is referred to herein as a "DATA CATALOG" 508. A block 1010 provides for creating this DATA CATALOG as a combination of the PHYSICAL, DECODE, and GLOBAL LAYER databases. The DATA CATALOG thus tracks the PHYSICAL, DECODE, and GLOBAL layers for all aircraft in an operator's fleet. Through manual operator interaction or programmatic interaction with DATA CATALOG 508, it is possible to determine whether any specific aircraft in the fleet supports (or can support) a given data processing rule that the operator wants to promulgate to aircraft in the fleet. In a standard exemplary implementation, the DATA CATALOG is part of an airline's ground infrastructure and is associated with a CONTROL NODE 110, which is discussed below in connection with FIG. 1.

As described herein, DATA CATALOG 508 is an electronic inventory system, responsible for tracking the data elements—PHYSICAL, DECODE, and GLOBAL—that are available on each aircraft. In addition to maintaining such an inventory, it is also important to derive the GLOBAL UNITS on each aircraft in such a way that they are made available for use in LOGIC CONFIGURATIONS that can run on each aircraft's data processing system. In essence, this process of deriving the GLOBAL UNITS is what makes the DATA CATALOG an accurate representation of the data that is actually available on each aircraft for data processing in accord with LOGIC CONFIGURATIONS that are developed and deployed to one or more aircraft in the fleet, as described herein.

Exemplary Derivation of GLOBAL UNITS

The following sections describe a flexible system that provides the ability to derive GLOBAL UNITS and make such GLOBAL UNITS available to running instances of a LOGIC CONFIGURATION.

Referring to FIG. 1, the overall context of this exemplary novel approach is illustrated in a schematic block diagram 100, which illustrates an exemplary system for coupling data processing nodes on a plurality of aircraft and at a ground station in data communication with a control node. This approach is designed to facilitate the processing of aircraft data on one or more aircraft, e.g., the aircraft in an airline fleet. Onboard an aircraft, DATA PROCESSING NODES 102 are connected to sources of AIRCRAFT TELEMETRY DATA 104. DATA PROCESSING NODES 102' may also be present offboard the aircraft (i.e., on the ground, as shown in the lower left corner of FIG. 1), although ground-resident nodes would not be directly connected to sources of AIRCRAFT TELEMETRY DATA 104. DATA PROCESSING NODES 102 on the aircraft are connected to ground-based CONTROL NODE 110 and ground-based DATA PROCESSING NODES 110 via a shared COMPUTER NETWORK 108. In this topology, DATA PROCESSING NODES 102 can send the output of their data processing activities to DATA PROCESSING NODES 102' on the ground for further processing. Similarly, CONTROL NODE 110 can send instructions to all DATA PROCESSING NODES 102 and 102' via COMPUTER NETWORK 106 and receive status messages from the DATA PROCESSING NODES regarding the status of such instructions.

Figure 2:
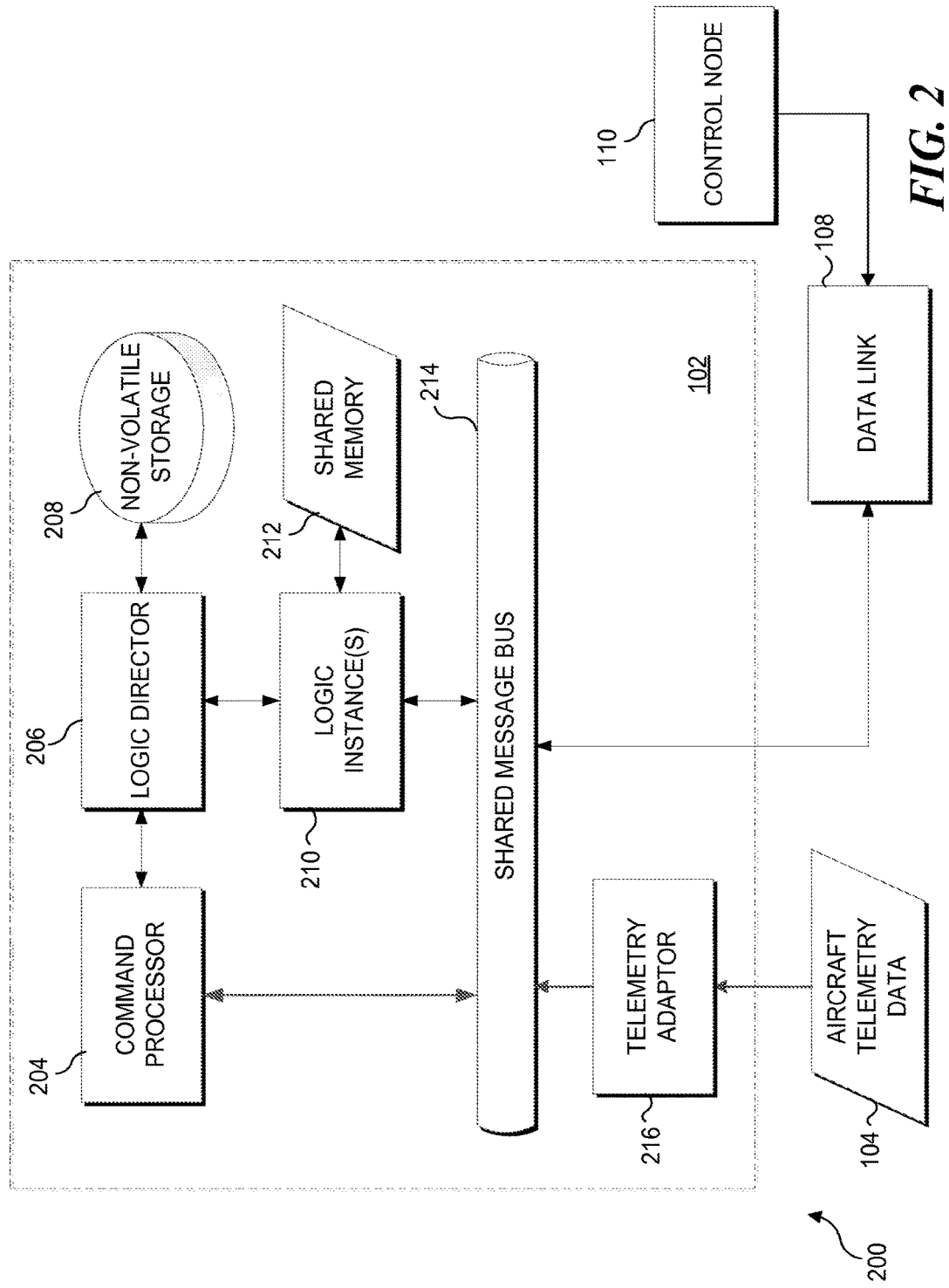
FIG. 2 is an exemplary block diagram illustrating internal details of an exemplary DATA PROCESSING NODE.

Referring to FIG. 2, a block diagram 200 illustrates the internals of an exemplary DATA PROCESSING NODE 102. COMMAND PROCESSOR 204 monitors a SHARED MESSAGE BUS 214 to detect instructions/commands received from CONTROL NODE 110 via a DATA LINK 108. The CONTROL NODE sends commands to the COMMAND PROCESSOR when changes are desired to the data processing logic on any one or more DATA PROCESSING NODES 102. When COMMAND PROCESSOR 204 receives an instruction to instantiate a new unit of data processing logic (a "LOGIC CONFIGURATION") from the CONTROL NODE, the COMMAND PROCESSOR sends the LOGIC CONFIGURATION to a LOGIC DIRECTOR 206 and instructs the LOGIC DIRECTOR to add the logic to its inventory. Optionally, the COMMAND PROCESSOR can implement a form of programmatic authentication to ensure that the received command actually originated from CONTROL NODE 110 before sending any instructions to the LOGIC DIRECTOR; such authentication could take the form of cryptographic controls, password checking, an IP address validation, or a variety of existing or future authentication mechanisms. LOGIC DIRECTOR 206 writes the new LOGIC CONFIGURATION to a NON-VOLATILE STORAGE 208, such that the LOGIC DIRECTOR can activate the logic when transitioning from an offline to an online state (as can happen after a power failure or after an intentional restart of the DATA PROCESSING NODE). The LOGIC DIRECTOR then creates a new execution thread and configures the thread with the desired LOGIC CONFIGURATION; this executing instance of a LOGIC CONFIGURATION is a LOGIC INSTANCE 210 that is actually running on the aircraft (as distinct from a LOGIC CONFIGURATION) that is stored and inert in NON-VOLATILE STORAGE 208. The sequence in which LOGIC DIRECTOR 206 stores the LOGIC CONFIGURATION to NON-VOLATILE STORAGE 208 and then actives a LOGIC INSTANCE 210 is unimportant to the present novel approach, since these functions can be carried out in the opposite order, with equivalent results.

Sources of aircraft telemetry data 104 are connected to DATA PROCESSING NODE 102, and a TELEMETRY ADAPTOR 216 receives AIRCRAFT TELEMETRY DATA 104 that is produced by these sources. TELEMETRY ADAPTOR 216 supports the data formats and communication protocols that are necessary to receive the desired TELEMETRY DATA. TELEMETRY ADAPTOR 216 converts AIRCRAFT TELEMETRY DATA 104 into messages that are compatible with SHARED MESSAGE BUS 214 and transmits these messages to the SHARED MESSAGE BUS.

Each LOGIC INSTANCE 210 consumes AIRCRAFT TELEMETRY DATA 104 from SHARED MESSAGE BUS 214 and/or from a SHARED MEMORY 212. Likewise, LOGIC INSTANCES 210 may produce data that is carried on SHARED MESSAGE BUS 214 or stored in SHARED MEMORY 212. This design enables the output from one LOGIC INSTANCE 210 to be used as an input for one or more different LOGIC INSTANCES 210 on the same DATA PROCESSING NODE 102. Additionally, the SHARED MESSAGE BUS can be extended to other DATA PROCESSING NODES 102 via DATA LINK 108, such that the LOGIC INSTANCES on one DATA PROCESSING NODE 102 can consume the output from a LOGIC INSTANCE 210 on a different DATA PROCESSING NODE 102.

The system described here uses one or more LOGIC CONFIGURATIONS 302 to implement the decoding of data elements from PHYSICAL LAYER 608 representation and also to derive GLOBAL UNITS 702 from the DECODED DATA 704 and 708 representations. Because the output of a LOGIC CONFIGURATION 302 is always written to SHARED MESSAGE BUS 214 or to SHARED MEMORY 212, all DECODED DATA and all GLOBAL UNITS are available for use by other LOGIC CONFIGURATIONS 302. With this method, airline operators can develop new LOGIC CONFIGURATIONS 302 that reference GLOBAL UNITS 702 and are insulated from changes to the underlying avionics equipment on the aircraft. As noted above, if the avionics equipment on an aircraft is changed, the LOGIC CONFIGURATION(S) that are responsible for the derivation of GLOBAL UNITS may change, but other LOGIC CONFIGURATIONS 302 that depend on GLOBAL UNITS 702 can continue to function properly without being modified.

Figure 3:
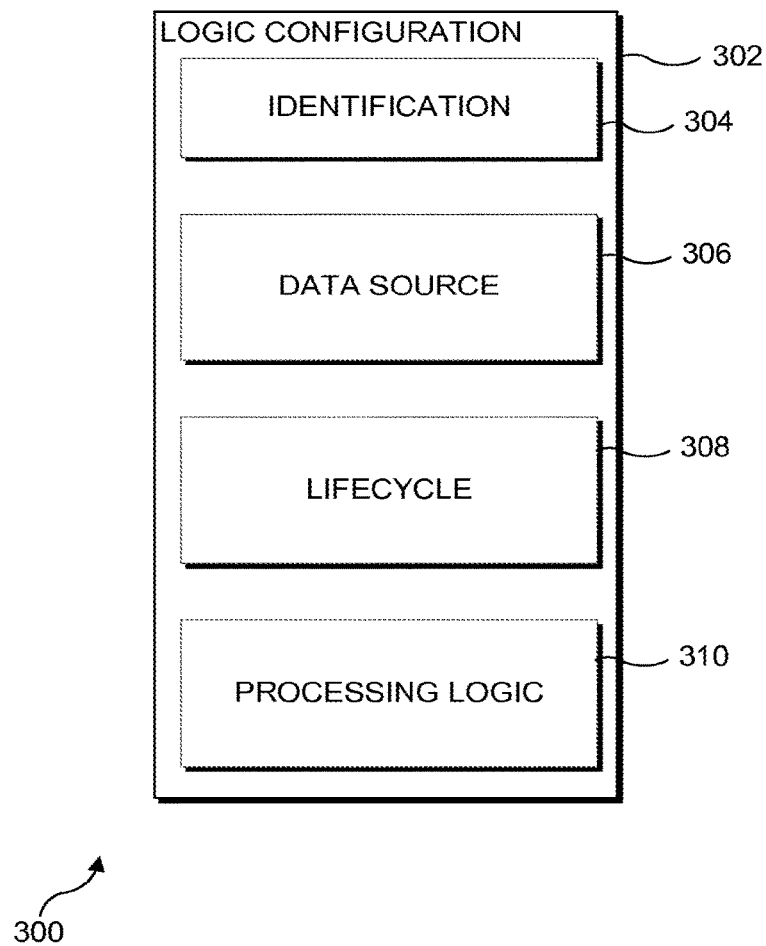
FIG. 3 is a block diagram illustrating an exemplary LOGIC CONFIGURATION used in connection with deploying processing logic to different aircraft in a fleet of aircraft.

Referring to FIG. 3 (and to elements of FIG. 2), the structure of an exemplary LOGIC CONFIGURATION 300 is shown. Each LOGIC CONFIGURATION 300 includes the following elements:

a. a unique IDENTIFICATION 304 to distinguish it from other LOGIC CONFIGURATIONS in the inventory of an individual LOGIC DIRECTOR 206 or in the global inventory maintained in a CONTROL NODE 110;

b. a DATA SOURCE 306 configuration to enable a LOGIC INSTANCE 210 to locate and connect to the desired data source(s), which may include SHARED MESSAGE BUS 214, the SHARED MEMORY 212, or both;

c. a LIFECYCLE 308 configuration to control the timing and longevity of corresponding LOGIC INSTANCE 210; and d. a PROCESSING LOGIC 310 configuration to describe the specific data processing instructions that are to be executed by the LOGIC INSTANCE.

Figure 4:
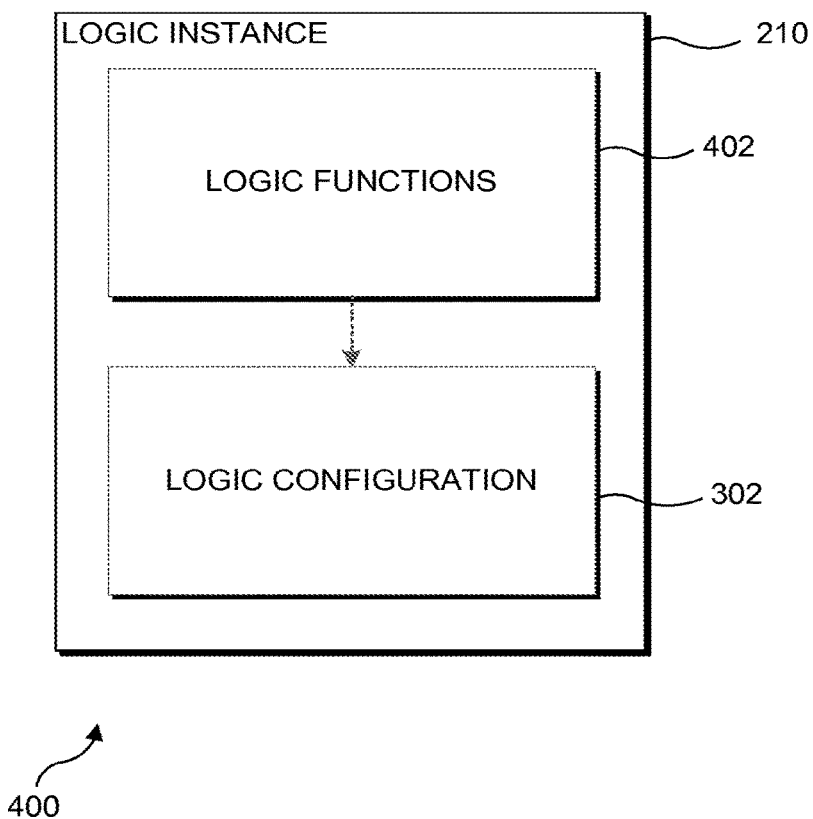
FIG. 4 is a block diagram of an exemplary LOGIC INSTANCE, which includes LOGIC FUNCTIONS and a LOGIC CONFIGURATION.

Referring to FIG. 4, additional LOGIC FUNCTIONS 402 are provided within the context of all LOGIC INSTANCES 210. These LOGIC FUNCTIONS are reusable software functions that enable LOGIC INSTANCES 210 to perform common tasks, while minimizing the length and complexity of PROCESSING LOGIC 310. The types of LOGIC FUNCTIONS 402 that are available in the context of a LOGIC INSTANCE 210 are the following:

a. functions to retrieve the LOGIC CONFIGURATION of the associated LOGIC INSTANCE 210;

b. functions to retrieve named data elements from messages on SHARED MESSAGE BUS 214 or directly from SHARED MEMORY 212;

c. functions to persist data messages to non-volatile storage;

d. functions to create new data messages or modify existing data messages;

e. functions to configure the output channel used for messages on SHARED MESSAGE BUS 214;

f. functions to write data to SHARED MEMORY 212, so the data can be used by other LOGIC INSTANCES;

g. functions to implement timers, so as to enable time-based control of processing logic;

h. functions to implement counters, so as to enable counter-based control of processing logic; and i. functions to assist with common mathematical computation, including, for example, and without any implied limitation, functions to average a list of values, find a maximum value, find a minimum value, find a most recent value, and other similar capabilities.

A LOGIC CONFIGURATION 302 can define processing logic that can access data elements (preferably GLOBAL DATA ELEMENTS) to carry out a multitude of processing functions. For example, and without any implied limitation, the processing logic can monitor engine temperature available on an avionics engine monitoring system (note that the temperature can be derived from the value and units produced by the avionics engine monitor system to provide a GLOBAL DATA ELEMENT as described above) and sound an alarm if the engine temperature exceeds a predefined maximum value, or a LOGIC CONFIGURATION might include a LOGIC INSTANCE for computing an average aircraft cabin pressure—again using a GLOBAL DATA ELEMENT for the pressure derived from the data elements produced by a cabin pressure gauge. It will be understood that the nature of the processing of data elements implemented by LOGIC CONFIGURATIONS 302 is virtually limitless. With the use of LOGIC FUNCTIONS 402, the number of characters in a LOGIC CONFIGURATION 302 is kept to a minimum, which has benefits when transmitting a LOGIC CONFIGURATION 302 over an AIR/GROUND DATA LINK 108 to a DATA PROCESSING NODE 102.

Figure 5:
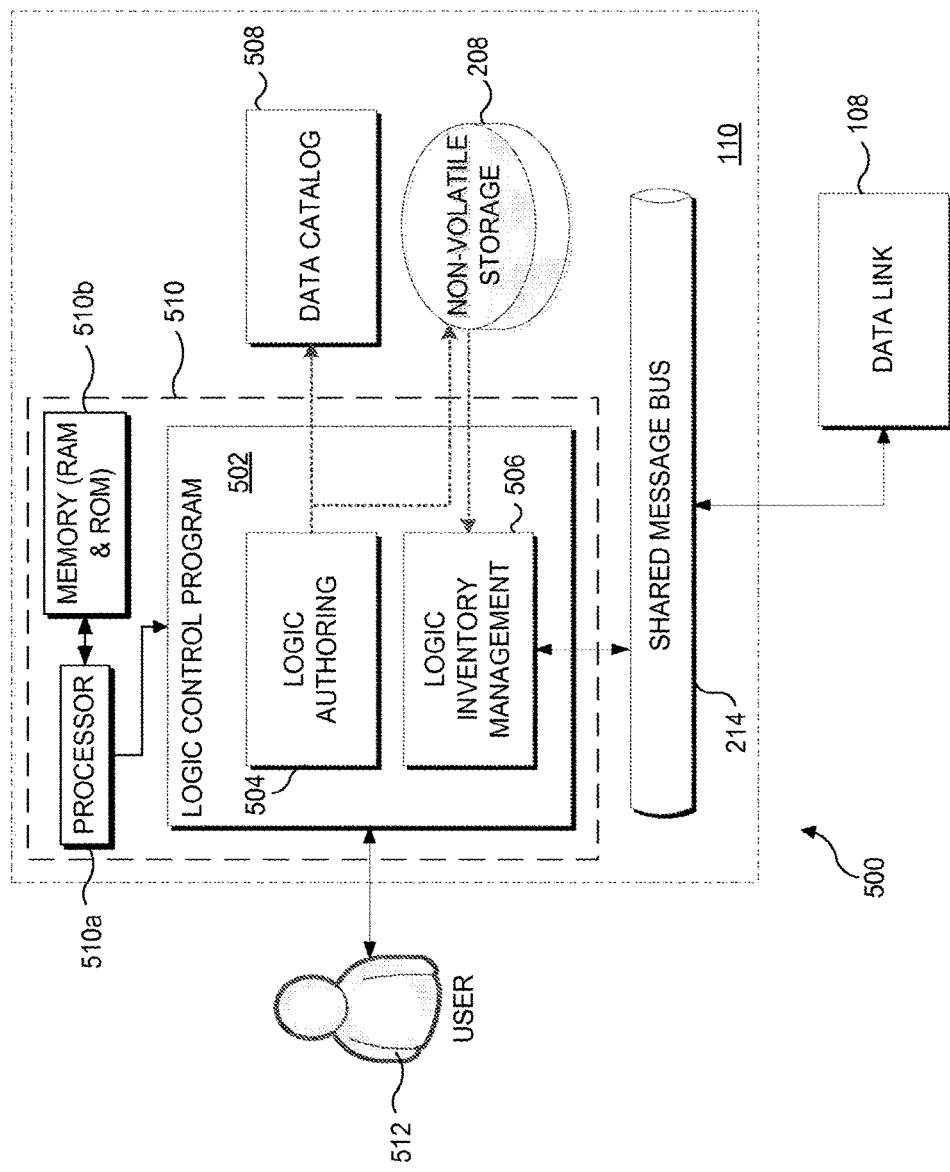
FIG. 5 is a schematic block diagram illustrating various aspects of an exemplary CONTROL NODE.

In addition to DATA CATALOG 508 and the ability for a data processing system to derive GLOBAL UNITS 702, it is beneficial for the DATA CATALOG to be integrated with the process for authoring new LOGIC CONFIGURATIONS that are employed for processing aircraft data. Referring to FIG. 5, various aspects of exemplary CONTROL NODE 110 are shown in more detail. The CONTROL NODE provides capabilities for creating or modifying LOGIC CONFIGURATIONS 302 and for managing the deployment and life-cycle of the LOGIC CONFIGURATIONS in regard to DATA PROCESSING NODES 102 (whether on an aircraft or on the ground).

Figure 11:
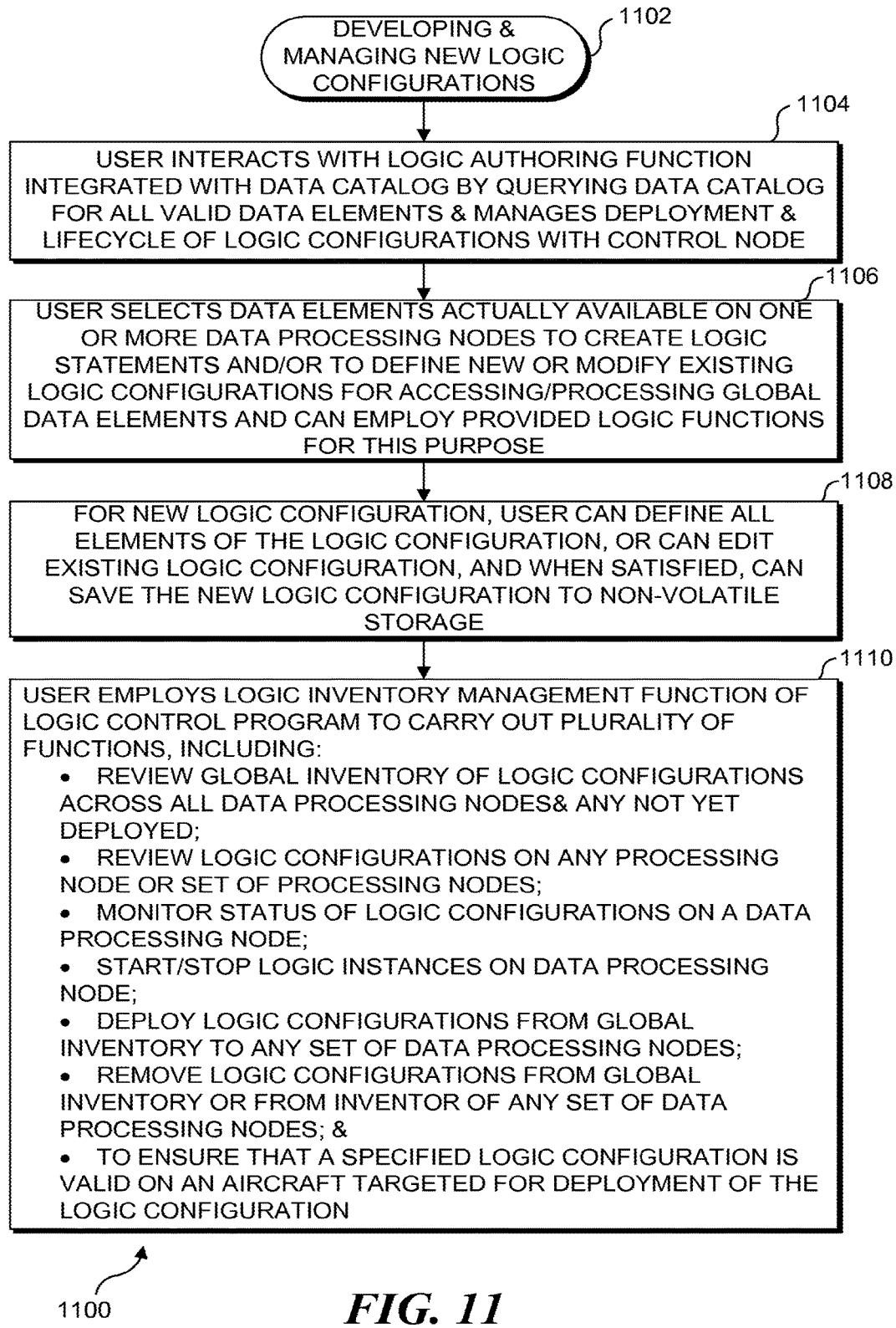
FIG. 11 is a flowchart illustrating exemplary logic for developing and managing new LOGIC CONFIGURATIONS.

The following discussion references numbered elements of both FIGS. 5 and 11. A LOGIC CONTROL PROGRAM 502 executed by a computing device 510 provides capabilities for a user to develop and manage data processing logic to be carried out on DATA PROCESSING NODES 102. Computing device 510 can comprise, for example, one or more servers, one or more desktop computers, one or more laptop computers, and/or one or more other types of computing hardware. The computing device includes a processor 510a and a memory 510b having both random access memory (RAM) and read only memory (ROM) in which machine executable instructions comprising LOGIC CONTROL PROGRAM 502 and other software modules can be loaded or stored for execution by the processor. A flowchart 1100 in FIG. 11 illustrates exemplary logic for developing and managing new LOGIC CONFIGURATIONS, as indicated in a start block 1102. As noted in a block 1104, to develop new LOGIC CONFIGURATIONS or modify existing LOGIC CONFIGURATIONS 302, an operator interacts with a LOGIC AUTHORING function 504. The LOGIC AUTHORING function is integrated with DATA CATALOG 508 through a set of software interfaces in such a way to facilitate the creation of valid LOGIC CONFIGURATIONS 302. When a USER 512 interacts with LOGIC AUTHORING function 504, the authoring interface queries DATA CATALOG 508 for a list of valid data elements—including elements in the DECODE and GLOBAL layers—and presents this list to USER 512 through a structured logic-editing interface. In this manner, the elements can easily be incorporated (e.g., using drag-and-drop, radio button selection, or other technical mechanism known in the art for selecting an element through a computer user interface) as building blocks into more complex logic statements. As suggested by a block 1106, the interaction between the LOGIC AUTHORING function 504 and DATA CATALOG 508 ensures that LOGIC CONFIGURATIONS 302 developed with LOGIC AUTHORING function 504 only reference data that are actually available on one or more DATA PROCESSING NODES 102. In contrast, the current state of the art in the aviation industry requires users to manually validate anything that might be viewed as an equivalent of a logic configuration function for each aircraft on which the new logic function will be deployed.

As provided in a block 1108, for a new LOGIC CONFIGURATION, LOGIC AUTHORING function 504 enables USER 512 to define all elements of the LOGIC CONFIGURATION and, when the USER is satisfied, to save the new LOGIC CONFIGURATION to a NON-VOLATILE STORAGE 208. The NON-VOLATILE STORAGE associated with LOGIC CONTROL PROGRAM 502 stores the complete inventory of LOGIC CONFIGURATIONS 302 for all DATA PROCESSING NODES 102. For existing LOGIC CONFIGURATIONS 302, the LOGIC AUTHORING function enables USER 512 to select and edit a LOGIC CONFIGURATION 302 from the global inventory. When a LOGIC CONFIGURATION is selected for editing, LOGIC AUTHORING function 504 fetches it from NON-VOLATILE STORAGE 208 and presents it to USER 512 for editing. When the USER is satisfied, LOGIC AUTHORING function 504 saves the modified LOGIC CONFIGURATION back to NON-VOLATILE STORAGE 208.

A block 1110 indicates that LOGIC INVENTORY MANAGEMENT function 506 of LOGIC CONTROL PROGRAM 502 enables USER 512 to perform the following actions:

a. review the complete, global inventory of LOGIC CONFIGURATIONS 302 (the superset of LOGIC CONFIGURATIONS across all DATA PROCESSING NODES 102 and any that have been generated through LOGIC AUTHORING function 504 that have not yet been deployed to any DATA PROCESSING NODE 102;

b. review the inventory of LOGIC CONFIGURATIONS 302 on any DATA PROCESSING NODE 102 or set of DATA PROCESSING NODES;

c. monitor the status of LOGIC CONFIGURATIONS 302 on a DATA PROCESSING NODE;

d. stop or start LOGIC INSTANCES 210 on any DATA PROCESSING NODE 102;

e. deploy LOGIC CONFIGURATIONS 302 from the global inventory to any set of DATA PROCESSING NODES 102; and f. remove LOGIC CONFIGURATIONS 302 from the global inventory or from the inventory of any set of DATA PROCESSING NODES 102.

For any of the above functions that require insight into real-time status of LOGIC CONFIGURATIONS 302 on a DATA PROCESSING NODE 102, LOGIC INVENTORY MANAGEMENT function 506 interacts with COMMAND PROCESSOR 204 on the node—whether through an AIR/

GROUND DATA LINK 108 for aircraft-installed nodes, or through standard terrestrial networks for ground-resident nodes—through a well-defined request/response pattern to determine the current state of affairs.

In a manner similar to LOGIC AUTHORING function 504, LOGIC INVENTORY MANAGEMENT function 506 can be integrated with DATA CATALOG 508 through a set of software interfaces to ensure that LOGIC CONFIGURATIONS 302 are only deployed to aircraft that can support the configuration. Although LOGIC AUTHORING function 504 ensures that each LOGIC CONFIGURATION 302 will be valid in the context of at least one aircraft, it does not ensure that each LOGIC CONFIGURATION 302 will be valid in the context of all of an operator's aircraft. In some cases, it is simply not possible to derive the same GLOBAL UNIT identically across all aircraft in an operator's fleet. In such cases, or in instances where the operator chooses to develop a LOGIC CONFIGURATION 302 that references DECODED DATA (which is not independent of a specific aircraft's equipment), LOGIC INVENTORY MANAGEMENT function 506 will ensure that the specified LOGIC CONFIGURATION is valid on the aircraft targeted for deployment of the LOGIC CONFIGURATION.

Figure 12:
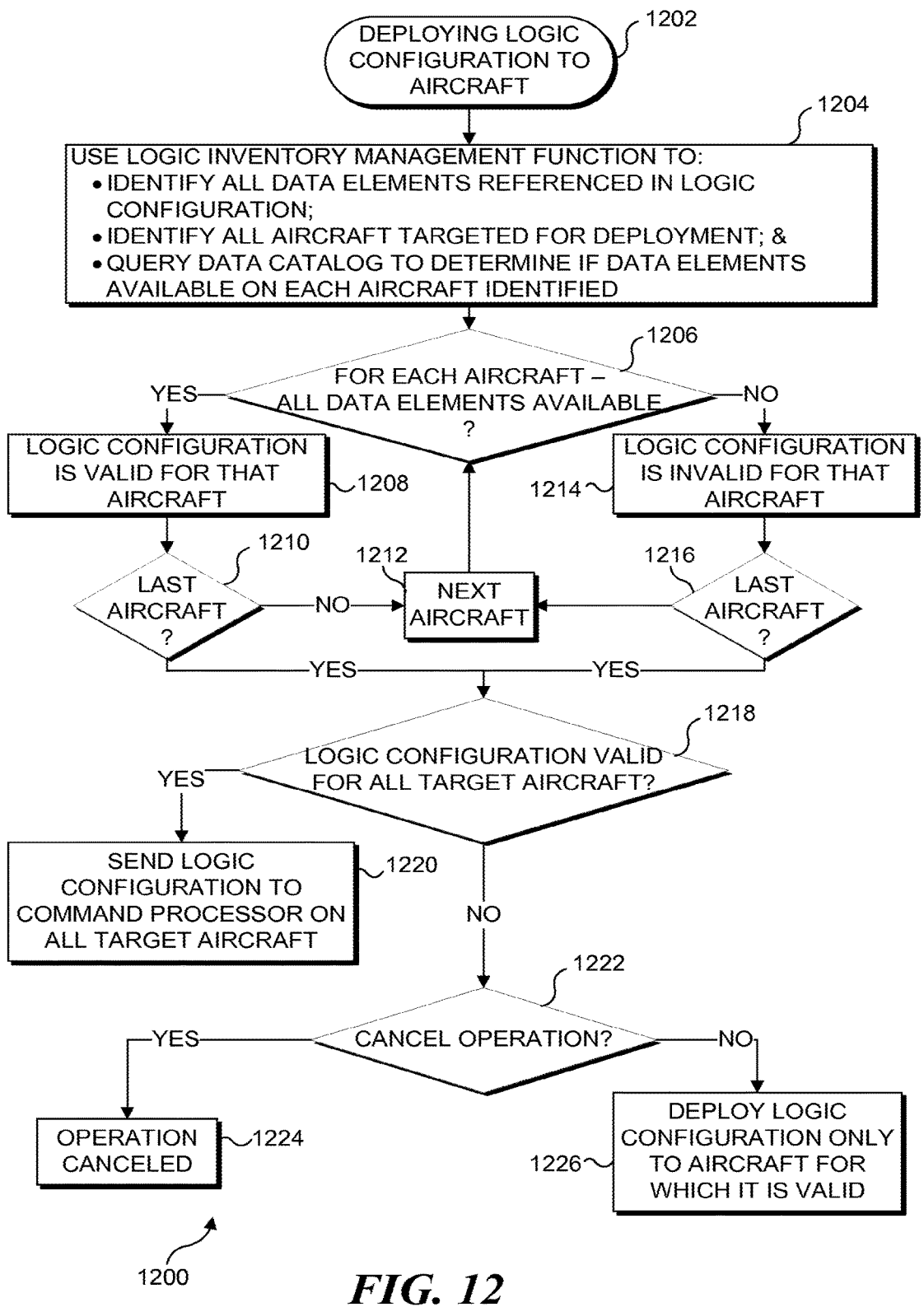
FIG. 12 is a flowchart illustrating exemplary logic for deploying a LOGIC CONFIGURATION to aircraft in a fleet.

A flowchart 1200 in FIG. 12 illustrates exemplary logic for deploying a LOGIC CONFIGURATION to aircraft in a fleet, as noted in a start block 1202. As indicated in a block 1204—in regard to the first two functions (a) and (b) listed below, when USER 512 instructs LOGIC INVENTORY MANAGEMENT function 506 to deploy a LOGIC CONFIGURATION to one or more aircraft, LOGIC INVENTORY MANAGEMENT function 506 performs the following actions:
  a. identifies all data elements referenced in the LOGIC CONFIGURATION;
  b. identifies all aircraft targeted for the desired deployment; and
  c. for each aircraft, queries DATA CATALOG 508 to determine whether all data elements are available on the aircraft;
    1. a decision block 1206 determines if all data elements are available on an aircraft, and if so, a block 1208 indicates that the LOGIC CONFIGURATION is valid for that aircraft;
    2. if some or all the data elements are unavailable on an aircraft, consider the LOGIC CONFIGURATION invalid for that aircraft, as indicated in a block 1214 (a decision block 1210 determines if the last aircraft to which the USER wants to deploy the LOGIC CONFIGURATION has been checked for validity and if not, a block 1212 check the next aircraft in decision block 1206 and similarly, if the LOGIC CONFIGURATION was invalid for the last aircraft in block 1214, a decision block checks to determine if the last aircraft to be potentially targeted has been checked, and if not, the logic also proceeds to block 1212, until all aircraft have been evaluated);
    3. a decision block 1218 then determines if the LOGIC CONFIGURATION is considered valid for ALL the target aircraft, and if so, a block 1220 provides for sending the LOGIC CONFIGURATION to COMMAND PROCESSOR 204 on all target aircraft; and
    4. if the LOGIC CONFIGURATION is considered invalid on some or all of the target aircraft, present USER 512 with an option to cancel the entire operation in a decision block 1222, which is then done in a block 1224, or alternatively, to deploy the LOGIC CONFIGURATION only to those aircraft on which the LOGIC CONFIGURATION is considered valid, as indicated in block 1226.

In the context of this exemplary embodiment, one of the more interesting aspects of LOGIC INVENTORY MANAGEMENT function 506 is its ability to deploy known good LOGIC CONFIGURATIONS 302 to an aircraft, whenever the aircraft has network connectivity, and to ensure a LOGIC CONFIGURATION will run smoothly on any aircraft on which it is deployed. Accordingly, it is not necessary that the aircraft be parked on the ground in order to deploy new or modified LOGIC CONFIGURATIONS to the aircraft, so long as there is network connectivity with the DATA PROCESSING NODE(S) 102 on the aircraft.

Clarifying Example

It may be helpful to provide an example of how the present approach is applied to specific instance. In this example, the avionics system on some of the aircraft in a fleet might monitor internal cabin pressure using sensors coupled to an ARINC 717 data bus, so that the telemetry data for cabin pressure (at the PHYSICAL LAYER) conforms to the corresponding protocol and format for ARINC 717. On other aircraft in the fleet, cabin pressure might be measured by sensors that produce telemetry data according to the ARINC 429 protocol and format (at the PHYSICAL LAYER). Further, the telemetry data on the first group of aircraft may monitor pressure in terms of Pascals, while those on the second group of aircraft might monitor pressure in terms of pounds per square inch (PSI). The PHYSICAL LAYER data elements would be simply the binary data stream conveyed on selected data bus channels of each different group of aircraft. The present approach would process these binary PHYSICAL data elements using different predefined decoding rules to generate corresponding DECODE DATA elements. For the first group of aircraft, the DECODE DATA might be then identified as CABIN PRESSURE.717, while for the second group of aircraft, the DECODE DATA might be identified as CABIN PRESSURE.429. Further, the DECODE DATA for both groups of aircraft would be in the same format and protocol, but still might be in terms of Pascals for CABIN PRESSURE.717 and PSI for CABIN PRESSURE.429. Further, this example assumes that derivation rules are then applied to the DECODE DATA for cabin pressure, to compute corresponding GLOBAL DATA elements referenced simply as CABIN PRESSURE, which is in terms of a desired unit, such as PSI, for both groups of aircraft. The same approach might be employed to monitored telemetry data for ambient air pressure outside an aircraft, for example, based on telemetry data used to determine altitude as a function of the ambient air pressure. Regardless of the form and protocol used for this data on each group of aircraft, the same units, format, and protocol would be derived for the GLOBAL LAYER data elements for AMBIENT AIR PRESSURE.

Now, assume that an airline might want to determine relative loading on the air compressors used to pressurize the passenger compartment on the aircraft in their fleet as a function of the delta between CABIN PRESSURE and AMBIENT AIR PRESSURE, since the compressors will be more heavily loaded to maintain a desired CABIN PRESSURE as the aircraft climb to higher altitudes where the AMBIENT AIR PRESSURE is lower. A user might enable this delta value to be determined by creating a LOGIC CONFIGURATION in which the processing logic determines the difference between the GLOBAL LAYER data elements of CABIN PRESSURE and AMBIENT AIR PRESSURE. Since both groups of aircraft have GLOBAL LAYER data elements in common for these variables, it is a simple matter to create the LOGIC CONFIGURATION to compute the delta value and deploy it to both groups of aircraft. The result of executing the LOGIC CONFIGURATION can then be transmitted back to a ground station or stored in NON-VOLATILE STORAGE 208 on each aircraft for further processing as desired.

Further, assume that the airline might want to minimize bandwidth usage for aircraft-to-ground station communication pertaining to the computed delta between CABIN PRESSURE and AMBIENT AIR PRESSURE. A user can control bandwidth usage by creating a new LOGIC CONFIGURATION in which the processing logic compares the delta value to a predefined threshold value. In the event that the delta value exceeds the predefined threshold value, the processing logic can determine whether the aircraft is in the air by reading the value of an AIR GROUND INDICATOR element, and if the aircraft is in the air, can generate a message with the computed delta value, a metadata element to describe the message as an ALERT message, and a metadata element to indicate that the message should be sent from the aircraft to the ground station. The result of executing this new LOGIC CONFIGURATION is that an ALERT message arrives at the ground station for subsequent processing by the control node.

Although the concepts disclosed herein have been described in connection with the preferred form of practicing them and modifications thereto, those of ordinary skill in the art will understand that many other modifications can be made thereto within the scope of the claims that follow. Accordingly, it is not intended that the scope of these concepts in any way be limited by the above description, but instead be determined entirely by reference to the claims that follow.

The invention claimed is:

1. A method for enabling creation and maintenance of inventories of data elements available on an aircraft fleet, the method comprising:
   accessing aircraft telemetry data from avionics equipment on a plurality of aircraft, the aircraft telemetry data comprising physical-layer datasets, wherein a first subset of the physical-layer datasets uses a first physical-layer protocol and a second subset of the physical-layer datasets uses a second physical-layer protocol that is different from the first physical-layer protocol;
   generating, with a processing system, decoded data elements by decoding the physical-layer datasets accessed from the avionics equipment, wherein the decoded data elements have a common protocol and format;
   generating, with the processing system and from the decoded data elements, derivative data elements, wherein at least one of the derivative data elements corresponds to both the first subset of the physical-layer datasets using the first physical-layer protocol and the second subset of the physical-layer datasets using the second physical-layer protocol; and
   creating, with the processing system, an inventory comprising the derivative data elements stored in a data structure that is available for use by the plurality of aircraft.

2. The method of claim 1, further comprising:
   authoring new data processing logic for processing a selected subset of the decoded data elements on a selected subset of aircraft from the plurality of aircraft, wherein the selected subset of aircraft includes two aircraft with different types of avionics equipment;
   integrating the new data processing logic with the inventory comprising the derivative data elements;
   validating that the new data processing logic is capable of processing the selected subset of the decoded data elements on the selected subset of aircraft; and
   deploying, to each aircraft from the selected subset of aircraft and subsequent to the validation, the new data processing logic for use in processing the selected subset of the decoded data elements.

3. The method of claim 2, wherein the new data processing logic comprises a logic configuration that is executable on an aircraft to which the new data processing logic has been deployed for processing at least some of the derivative data elements.

4. The method of claim 3, wherein creating the inventory comprising the derivative data elements comprises creating a physical layer database that tracks physical characteristics of each data element that is available for the plurality of aircraft, wherein the physical characteristics for each data element include one or more of:
   a source avionics device or system that generates the data element;
   a physical communications channel on which the data element is conveyed;
   a protocol used on the physical communications channel on which the data element is conveyed;
   a type and precision of the data element;
   metadata used to uniquely identify the data element from among all other data elements conveyed on the physical communications channel; and
   a rate at which a value of the data element is updated.

5. The method of claim 4, further comprising using entries in the physical layer database for each aircraft of the plurality of aircraft to generate decoding rules associated with a decode layer database, wherein the decoding rules specify translations of the data elements in the physical layer database into messages having the common protocol and format.

6. The method of claim 5, further comprising:
   using the decode layer database to generate global data derivation rules that are executable to create, for each aircraft, a respective set of derivative data elements; and
   tracking, with a global layer database, associations between the derivative data elements, the global data derivation rules that create each global data element, and certain decoded data elements on which the global data derivation rules depend.

7. The method of claim 6, wherein the derivative data elements are each outputted in the common protocol and format used to generate associated decoded data elements, wherein the new data processing logic uses the common protocol and format to access both the derivative data elements and the associated decoded data elements.

8. The method of claim 7, wherein the physical layer database, the decode layer database, and the global layer database are included in a data catalog for the plurality of aircraft, wherein the method further comprises using the data catalog for determining whether a specific logic configuration can validly be deployed to a specific aircraft from the plurality of aircraft.

9. A system for creating inventories of data elements available on an aircraft fleet, the system comprising:
   a plurality of data processing nodes respectively installed on a plurality of aircraft, each data processing node being coupled to respective avionics equipment on a respective aircraft from the plurality of aircraft and configured to receive respective telemetry data produced by the respective avionics equipment, the plurality of data processing nodes configured for:
(i) accessing aircraft telemetry data from the avionics equipment on the plurality of aircraft, the aircraft telemetry data comprising physical-layer datasets, wherein a first subset of the physical-layer datasets uses a first physical-layer protocol and a second subset of the physical-layer datasets uses a second physical-layer protocol that is different from the first physical-layer protocol, generating decoded data elements by decoding the physical-layer datasets accessed from the avionics equipment, wherein the decoded data elements have a common protocol and format, and generating, from the decoded data elements, derivative data elements, wherein at least one of the derivative data elements corresponds to both the first subset of the physical-layer datasets using the first physical-layer protocol and the second subset of the physical-layer datasets using the second physical-layer protocol; and a network of data links communicatively coupling the plurality of data processing nodes with a control node; and the control node including a processor and a memory, the memory storing machine executable instructions that, when executed by the processor, configure the control node for creating an inventory that comprises the derivative data elements stored in a data structure that is available for use by the plurality of aircraft.

10. The system of claim 9, wherein the second plurality of functions implemented by the control node further include:
enabling generation of new data processing logic for processing a selected subset of the decoded data elements on a selected subset of aircraft from the plurality of aircraft, wherein the selected subset of aircraft includes two aircraft with different types of avionics equipment;
integrating the new data processing logic with the inventory comprising the derivative data elements;
validating that the new data processing logic is capable of processing the selected subset of the decoded data elements on the selected subset of aircraft; and
deploying, to each aircraft from the selected subset of aircraft and subsequent to the validation, the new data processing logic for use in processing the selected subset of the decoded data elements.

11. The system of claim 10, wherein the new data processing logic comprises a logic configuration that is executable on an aircraft to which the new data processing logic has been deployed for processing at least some of the derivative data elements.

12. The system of claim 11, wherein creating the inventory comprising the derivative data elements comprises creating a physical layer database that tracks physical characteristics of each data element that is available for the plurality of aircraft, wherein the physical characteristics for each data element include one or more of:
a source avionics device or system that generates the data element;
a physical communications channel on which the data element is conveyed;
a protocol used on the physical communications channel on which the data element is conveyed;
a type and precision of the data element; and
metadata used to uniquely identify the data element from among all other data elements conveyed on the physical communications channel.

13. The system of claim 12, wherein the plurality of data processing nodes are configured for using entries in the physical layer database for each aircraft of the plurality of aircraft to generate decoding rules associated with a decode layer database, wherein the decoding rules specify translations of the data elements in the physical layer database into messages having the common protocol and format.

14. The system of claim 13, wherein the plurality of data processing nodes are further configured for:
using the decode layer database to generate global data derivation rules that are executable to create, for each aircraft, a respective set of derivative data elements; and
tracking, with a global layer database, associations between the derivative data elements, the global data derivation rules that create each global data element, and certain decoded data elements on which the global data derivation rules depend.

15. A method for creating and deploying common processing logic that can be used in processing telemetry data produced by different types of avionics equipment installed on a plurality of an aircraft fleet, comprising:
defining, with a processing system and for a plurality of aircraft, physical-layer data elements by identifying different types of data elements corresponding to raw telemetry data produced by avionics equipment in the plurality of aircraft, the physical-layer data elements included in a physical-layer database, wherein a first subset of the raw telemetry data uses a first physical-layer protocol and a second subset of the raw telemetry data uses a second physical-layer protocol that is different from the first physical-layer protocol;
identifying, with the processing system and for the plurality of aircraft, decoded data elements in a decode layer by deriving the decoded data elements from the physical-layer data elements, the decoded data elements included in a decode-layer database;
identifying, with the processing system and for the plurality of aircraft, global data elements in a global layer by deriving the global data elements from the decoded data elements, the global data elements included in a global-layer database, wherein at least one of the global data elements corresponds to both the first subset of the raw telemetry data using the first physical-layer protocol and the second subset of the raw telemetry data using the second physical-layer protocol;
creating, with the processing system, a data catalog comprising the physical-layer database, the decode-layer database, and the global-layer database;
developing, with the processing system, a logic configuration comprising data-processing logic that processes a subset of the global data elements selected from the data catalog, wherein the subset of the global data elements includes the at least one of the global data elements corresponding to both the first subset of the raw telemetry data and the second subset of the raw telemetry data;
validating, with the processing system and based on the data catalog, a subset of aircraft from the plurality of aircraft for use with the logic configuration; and
deploying the validated logic configuration to the subset of aircraft from the plurality of aircraft.

16. The method of claim 15, wherein the decoded data elements are generated from the physical layer data elements using decoding rules for each aircraft.

17. The method of claim 15, wherein the global data elements are generated from the decoded data elements using derivation rules for each aircraft.

18. The method of claim 15, wherein details of each global data element are tracked in a global layer database.

19. The method of claim 18, wherein the details that are tracked in the global layer database for each global layer data element includes one or more of:
- a name of the global data element;
- metadata about the global data element;
- any association between the global data element and other global data elements;
- derivation logic used to generate the global data element; and
- any decoded data element on which the derivation logic depends.

20. The method of claim 15, further comprising enabling a user to edit existing logic configurations included in the data catalog or otherwise available for use on the plurality of aircraft.

* * * * *